Nov. 8, 1932.   C. A. WARD ET AL   1,887,224
ELECTRIC ICE CREAM DELIVERY TRUCK
Filed July 2, 1928   2 Sheets-Sheet 1

OSCAR E. H. FROELICH
CHARLES A. WARD
INVENTORS

ATTORNEYS

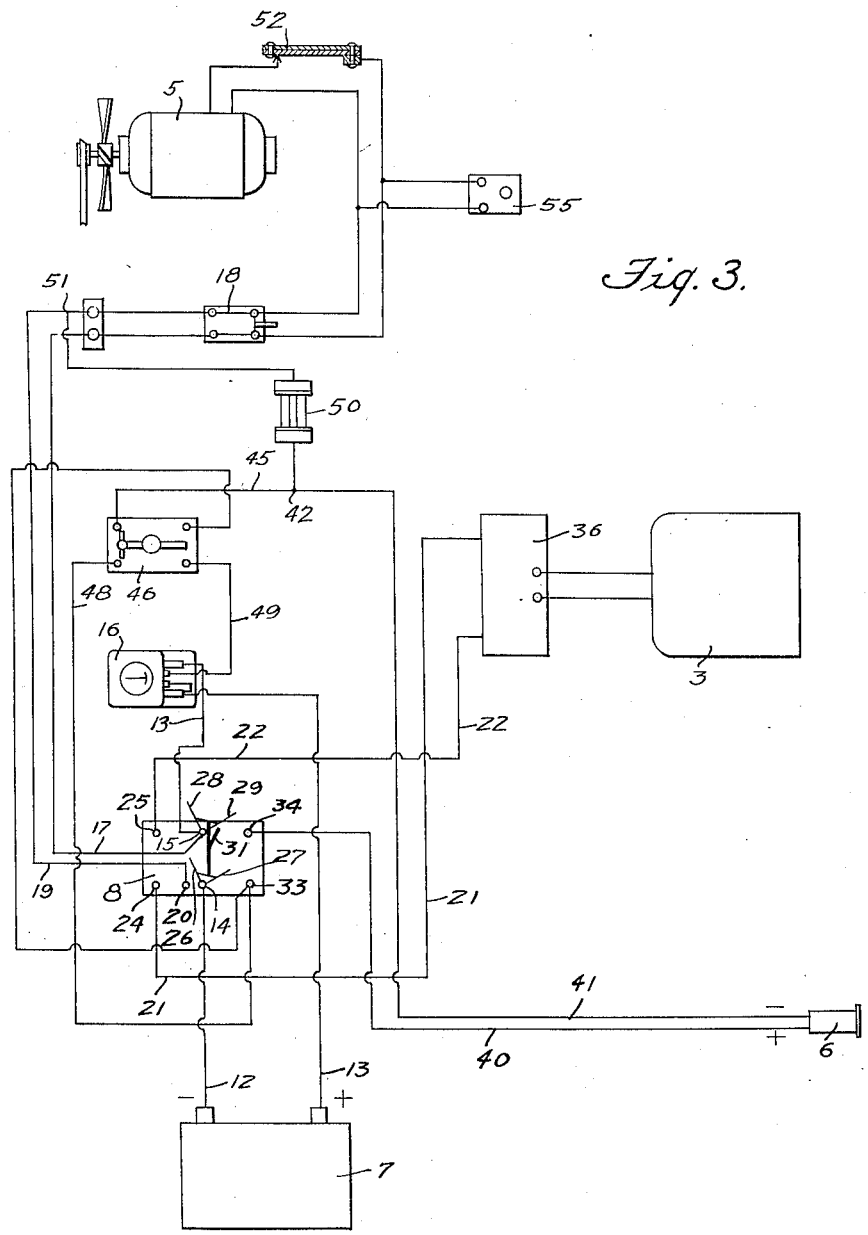

Patented Nov. 8, 1932

1,887,224

UNITED STATES PATENT OFFICE

CHARLES A. WARD, OF NEW ROCHELLE, AND OSCAR E. H. FROELICH, OF QUEENS VILLAGE, NEW YORK, ASSIGNORS TO WARD MOTOR VEHICLE COMPANY, OF MOUNT VERNON, NEW YORK, A CORPORATION OF NEW YORK

ELECTRIC ICE CREAM DELIVERY TRUCK

Application filed July 2, 1928. Serial No. 289,945.

This invention relates to refrigerated motor vehicles such as are used in transporting ice cream and particularly to electrically driven vehicles of this type.

In the ordinary ice cream delivery truck, ice and salt are placed in the body of the truck in order to cool the body and maintain the ice cream or other products therein at the desired low temperature. The ice and salt mixture is heavy and takes up a great deal of space, thereby considerably reducing the carrying capacity of the truck. The icing of the truck takes a great deal of labor and time. The ice melts rapidly and it is difficult to maintain the temperature in the truck body as low as is desirable especially in warm weather. The disadvantages inherent in a refrigerated vehicle in which ice is used as the refrigerating medium may be obviated by providing such vehicles with mechanical refrigerators.

The primary object of the present invention is to improve the construction and mode of operation of electrically driven refrigerated motor vehicles and to produce a vehicle of a type having a mechanical refrigerator which will operate in a reliable manner to produce and maintain the required low temperatures in the body of the truck.

Another object of the invention is to produce an electrically driven motor vehicle having a mechanical refrigerator which is operated and controlled in a novel and improved manner to suit the varying conditions occurring in connection with the operation of such vehicles.

With these and other objects in view the invention comprises the novel and improved features, constructions, arrangements and combinations of parts hereinafter described and particularly pointed out in the claims, the advantages of which will be readily understood and appreciated by those skilled in the art to which the invention relates.

The invention will be described with reference to the accompanying drawings which illustrate a preferred embodiment of the invention, in which—

Figure 3 is a diagrammatic showing of an electrical circuit such as may be employed in the present invention.

Figure 1:
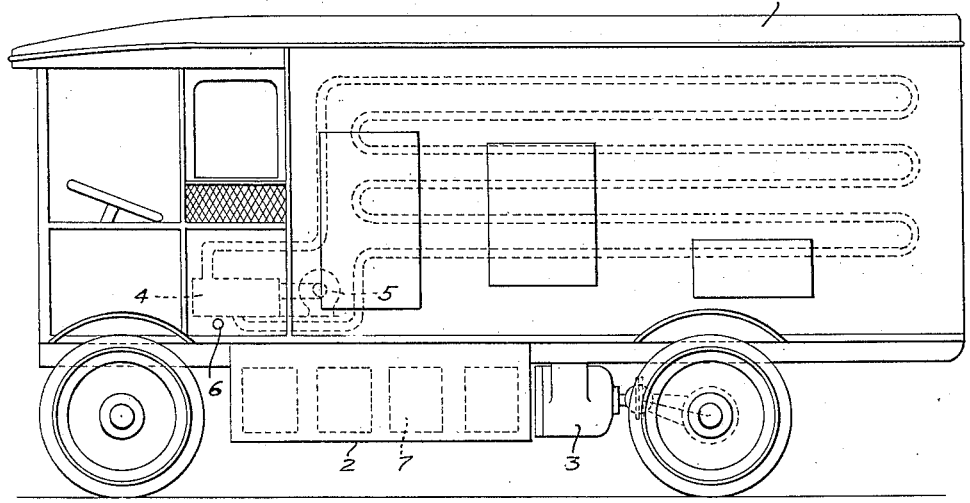
Figure 1 is a side view of an ice cream delivery truck embodying the present invention.

In the embodiment of the invention illustrated in the drawings an electrically driven ice cream delivery truck comprises a body 1 having a space 2 in which storage batteries for operating the vehicle may be carried. The motor 3 for driving the vehicle may be positioned at any convenient point as shown in Figure 1. A mechanical refrigerator used for maintaining the desired low temperature in the truck body is shown in dotted lines at 4 in Figure 1 and comprises a compressor operated by means of an electric motor 5. A conductor from any suitable source of current such as the ordinary city power circuit may be inserted in the socket 6 for supplying current to charge the storage batteries 7 carried in the space 2.

As a proportionately larger amount of power is required for cooling the ice cream compartment from room temperature to the desired cooling temperature than would be required to maintain a uniform temperature under delivery conditions, the present invention provides a circuit whereby the compressor may remain in operation while the battery is on charge. When the truck has completed a day's run or is undergoing minor repairs it is connected with the city power circuit so that the body will be maintained cool and the batteries recharged for further operation.

In order that the motor for operating the compressor for the mechanical refrigerator may be supplied with current at all times, both when the motor which drives the truck is operated and when this motor is out of operation, and also when the storage batteries are being charged, the present construction comprises a main switch 8, shown in detail in Figure 2, which may be thrown to various positions as will be indicated below, for connecting the refrigerator motor directly to the storage batteries so that it may be operated when the driving motor is in operation or when said motor is out of operation, and for connecting the refrigerator motor to the charging circuit so that it may be operated when the storage batteries are being charged.

The circuit shown in Figure 3 is illustrative of the type of circuit which may be employed for effecting the desired operation of the various elements of the combination.

As shown in Figure 3 conductors 12 and 13 lead from the negative and positive poles respectively of the storage batteries 7. The conductor 12 is connected to the switch element 14 of the switch 8 and the conductor 13 is connected with the switch element 15 of the switch 8 through the ampere hour meter 16. A second conductor 17 connects the switch element 15 with the refrigerator motor 5 through the switch 18. The opposite side of the refrigerator motor is connected through the switch 18 and the conductor 19 to the switch element 20 positioned adjacent to the element 14. The driving motor 3 is connected to the batteries 7 through the conductors 21 and 22 connected with the switch elements 24 and 25 respectively of the switch 8.

The switch 18 in the refrigerator motor circuit may be manually operated to set the refrigerator motor and compressor in operation. This switch is preferably a double pole switch which may be key-operated to prevent meddlesome persons or children from operating the same.

Figure 2:
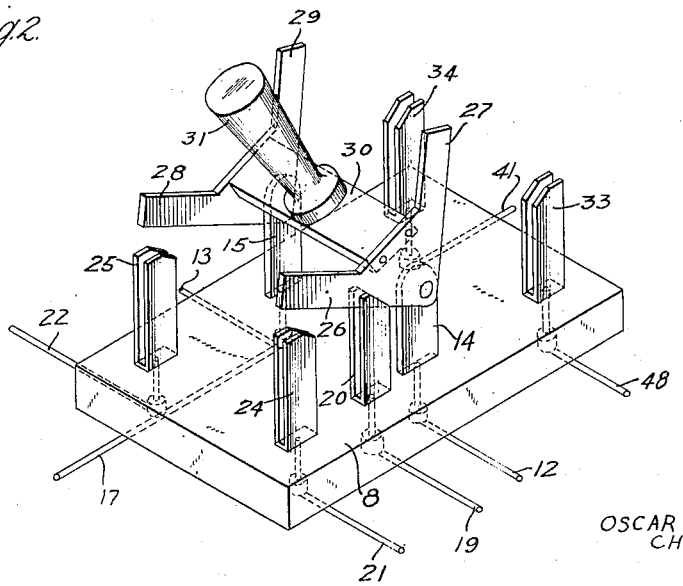
Figure 2 is a perspective of one type of control switch which may be employed.

The main switch 8 is clearly shown in Figure 2 and is designed to be thrown to any one of three positions which may be termed the running, neutral and charging positions. The switch comprises two central conducting elements 14 and 15 to which are pivoted right angled contact members 26—27 and 28—29. These contact members consist respectively of a member formed with blades 26 and 27 in conducting engagement with the switch element 14 and a member formed with blades 28 and 29 in conducting engagement with the switch element 15. An insulating block 30 is secured between the right angled contact members and is provided with a handle 31 for operating the switch.

On one side of the central switch elements 14 and 15 are located switch elements 24 and 25 in position to be engaged by the switch blades 26 and 28 respectively when the switch is thrown to running position. A third switch element 20 is located on the same side of the switch elements 14 and 15 and between the switch elements 14 and 24 to be engaged by the switch blade 26 when the switch is thrown to the neutral position, as shown in Figure 2. Two switch elements 33 and 34 are located on the opposite side of the elements 14 and 15 in positions to be engaged by the switch blades 27 and 29 respectively when the switch is thrown to the charging position. When the switch is thrown to running position the switch blade 26 bridges switch elements 14, 20 and 24 and the switch blade 28 bridges the elements 15 and 25. When the switch is thrown to the neutral position shown in Figure 2 the switch blades 26 and 28 are disengaged from the switch elements 24 and 25 respectively, but the blade 26 remains in contact with the switch element 20 so that the refrigerator motor circuit will not be broken. When the switch is moved to the charging position the switch blade 26 is disengaged from the switch element 20 and the blades 27 and 29 bridge contacts 14 and 33, and 15 and 34 respectively.

During operation through the day when the driving motor and refrigerating motor are both to be operated from the batteries 7, the switch 8 is thrown to the running position to cause the switch blade 26 to bridge contacts 14, 20 and 24, and to cause switch blade 28 to bridge contacts 15 and 25. The switch element 14 is connected to the negative pole of the batteries 7 through conductor 12 and the switch element 15 is connected to the positive pole of the battery through the ampere hour meter 16 and conductor 13. Thus when the switch 8 is thrown to the running position, current may be supplied from the batteries 7 to operate both the driving motor 3 and the refrigerator motor 5.

The current for driving the refrigerator motor passes from the switch element 14, which is connected to the negative pole of the batteries 7, to switch element 20 and then through the conductor 19 and the switch 18, when closed, to the refrigerator motor 5. From the motor 5 the current returns through switch 18 and conductor 17 to contact 15 from which it passes through the ampere hour meter 16 and conductor 13 to the positive side of the batteries 7.

Current for operating the driving motor passes from switch element 14 to switch element 24 and through conductor 21 and suitable controlling devices 36, for controlling the operation of the vehicle, to driving motor 3. The current returns through conductor 22 to contacts 25 and 15, from which it passes through the ampere hour meter 16 and conductor 13 to the batteries 7.

When it is desired to stop the truck the controlling devices 36 are actuated to break the driving motor circuit. If the driver is to leave the truck for any extended period the switch 8 is moved from the running position just described to the neutral position shown in Figure 2. The switch blades 26 and 28 are thus disconnected from switch elments 24 and 25 respectively, while the switch blade 26 still engages the switch element 20. The switch 8 is thrown to neutral position and is preferably locked in this position to prevent an unauthorized person from starting the truck by manipulation of the controlling devices while the driver is absent. When the driver returns the switch 8 is thrown back to running position before the controlling devices are operated to start the truck. The circuit including the driving motor is thus broken at the switch 8 and also at the controlling devices without affecting the circuit including the refrigerator motor.

When the truck has returned from the day's run and it is desired to charge the batteries 7 the switch 8 is thrown to the charging position in which the switch blades 27 and 29 respectively bridge switch elements 14 and 33 and switch elements 15 and 34. A plug connected to a suitable source of current is then inserted in the socket 6. The circuit is thus completed to connect the charging circuit to the storage batteries to recharge them. However, the circuit arrangement is such that a portion of the current is also used for operating the refrigerator motor to maintain the truck body cool while the batteries are being charged.

When the switch is thrown to the charging position a circuit is completed from the positive side of the socket 6 through conductor 40 to switch element 34, then through the element 15 to the ampere hour meter 16 and through the conductor 13 to the positive side of the batteries 7. The negative side of the plug 6 is connected to the conductor 41 so that current will pass through this conductor to the point 42 where the circuit divides. The major portion of the current is used for charging the batteries and passes through the conductor 45, circuit breaker 46 and conductor 48 to the switch element 33 and thence through the connecting switch blade 27 to switch element 14 and conductor 12 to the negative side of the batteries 7 completing the battery charging circuit.

A smaller amount of current for operating the refrigerator motor passes from the point 42 in the conductor 41 through a resistor 50 to the point 51 in the conductor 19. The current then passes through switch 18 to the refrigerator motor 5 and from the opposite side of the motor back through the other side of the switch 18 and conductor 17 to switch element 15 which is connected by switch blade 29 to the switch element 34 so that current passes through the conductor 40 to the positive side of the socket 6, thus completing the circuit for operating the refrigerator motor 5 when the batteries 7 are being charged.

When the batteries are fully charged a contact on the ampere hour meter 16 will make the necessary contact to complete a circuit through the conductor 49 for tripping the circuit breaker 46 so as to disconnect the batteries 7 from the charging circuit. The compressor motor, however, will continue to function from the charging circuit. The resistor 50 in the circuit for supplying current to the refrigerator motor 5 during the charging operation comprises a compensating resistor which reduces the voltage for energizing the compressor motor circuit to a normal value.

The thermostatically controlled switch 52 is provided in the refrigerator motor circuit to maintain the circuit complete until the truck body has reached a predetermined low temperature, at which time the thermostatically controlled switch will automatically break the refrigerator motor circuit to stop the operation of the refrigerator motor until the truck body has reached a predetermined maximum temperature. The switch 52 will then complete the circuit to energize the refrigerator motor again and bring the truck body back to the desired low temperature. Such thermostatically controlled switches are well known in the art and further showing and description of the switch is therefore unnecessary.

A signal light 55 is included in the refrigerator motor circuit which is lighted at all times when the circuit is in operating condition whether the motor is actually running or not. If one of the fuses 56 should be blown in this circuit, or the circuit should become otherwise inoperative, the light will be extinguished.

The ampere hour or watt meter 16 is so connected in the circuit that when the switch 8 is in the charging position the ampere hour meter will record only the current passing to the batteries. When the batteries have been fully recharged the ampere hour meter makes a contact to trip the circuit breaker to disconnect the battery from the charging line. When the switch 8 is in the running position, the ampere hour meter operates in the reverse direction and records the current passing from the batteries to both the driving motor and the refrigerator motor and when the switch is in the neutral position the ampere hour meter records the current passing to the refrigerator motor.

The operation of the device is as follows:

When it is desired to operate the refrigerator motor and compressor at the same time that the storage batteries are being charged the switch is thrown to the charging position to connect the switch elements 14 and 33 and the elements 15 and 34. In this way it is possible to charge the batteries in the vehicle and to operate the refrigerator motor 5 and the compressor of the refrigerator. The switch will ordinarily be thrown to this position before the ice cream delivery truck has started out on its daily route or when the truck is first put into operation so that the body of the truck may be brought to the desired low temperature and the batteries will be charged preparatory for an extended run.

After the batteries are suitably charged, the circuit breaker automatically cuts off the batteries from the charging circuit and an additional resistance is thrown into the refrigerator motor circuit to prevent burning out or injury to the refrigerator motor and the motor and compressor continue to be operated from the charging circuit, the desired temperature being maintained by the thermostatic switch 52.

It is found that more power is required to cool the truck body initially than to maintain it at the desired low temperature. By means of the present circuit arrangement it is possible to recharge the batteries and keep the body cool during the charging period without danger of overcharging the batteries or overloading the refrigerator motor circuit.

When the truck is to be operated the power line is disconnected from the charging circuit by removing the plug from the socket 6 and the switch 8 is thrown to the running position to bridge the contacts 14 and 24 and the contacts 15 and 25 in the driving motor circuit and also to establish the circuit for the refrigerator motor 5. The circuit for the driving motor then may be established to start the truck by manipulation of the controlling devices 36.

In stopping the truck the operator manipulates the controlling devices 36 to break the driving motor circuit at this point. The driving motor circuit may also be broken at the switch 8 by throwing this switch into neutral position, as a safety precaution when the truck is to be left by the driver. Thus, the driving motor circuit may be broken or established by the controlling devices 36 to start and stop the vehicle or the driving motor circuit may be broken or established at the switch 8 without affecting the refrigerator motor circuit.

It is to be understood that the invention is not limited to the particular construction and arrangement of parts of the illustrated embodiment of the invention, but that the invention may be embodied in other forms within the scope of the claims.

From the foregoing description it is seen that a single switch is employed to connect the refrigerator motor with either the battery or the charging line. The same switch also controls the passage of current to the driving motor without altering the refrigerator motor circuit, and is used to connect the battery to the charging circuit when the driving motor is de-energized. This control of the various circuits is effected by the manipulation of the main switch 8 into any one of three positions,—running, neutral or charging.

With the above arrangement no separate circuit connections are required for substituting one source of current for the other. By inserting the charging plug into the socket 6 and moving the switch 8 to charging position, the refrigerator motor is brought into operation while the battery is being charged.

It is to be understood that the invention is not limited to the particular construction and arrangement of parts of the illustrated embodiment of the invention but that the invention may be embodied in other forms within the scope of the claims.

What is claimed as new is:

1. In a vehicle, the combination of an electric motor for driving the vehicle, a mechanical refrigerator, an electric motor for operating the refrigerator, a source of electric current, and electrical connections for supplying current to said motors from said source comprising conductors for supplying current to said refrigerator motor when said source of current is out of operation.

2. In a vehicle, the combination of an electric motor for driving the vehicle, a mechanical refrigerator, an electric motor for operating the refrigerator, one or more storage batteries for supplying current to both said driving motor and said refrigerator motor, circuit elements through which current may be passed to charge said storage batteries, and circuit elements through which current may be passed to said refrigerator motor from the charging line both when said storage batteries are being charged and after charging is stopped.

3. An electrically driven refrigerated vehicle comprising a driving motor, a mechanical refrigerator, a motor for operating said refrigerator, one or more storage batteries for normally supplying current to operate both of said motors, and a circuit for supplying current to operate said refrigerator motor and to charge said storage batteries.

4. An electrically driven refrigerated vehicle comprising a driving motor, a mechanical refrigerator, a motor for operating said refrigerator, one or more storage batteries for supplying current to both of said motors, a circuit for supplying current to said storage batteries to charge the same, a circuit for supplying current to operate said refrigerator motor while said batteries are being charged, and means in the circuit which supplies current to said refrigerator motor for limiting the voltage impressed upon said circuit.

5. An electrically driven refrigerated vehicle comprising a driving motor, a mechanical refrigerator, a motor for operating said refrigerator, one or more storage batteries for supplying current to both of said motors, a circuit for supplying current to said storage batteries to charge the same, a circuit for supplying current to operate said refrigerator motor while said batteries are being charged, means for breaking said charging circuit when the batteries are sufficiently charged, and a resistance in the circuit which supplies current to said refrigerator motor to prevent overloading the same when the charging circuit is broken.

6. In a vehicle, the combination of an electric motor for driving the vehicle, a mechanical refrigerator, an electric motor for operating the refigerator, one or more storage batteries, a circuit through which current may be passed for energizing said driving motor, a circuit through which current may be passed to energize said refrigerator motor, a circuit through which current may be passed for charging said batteries, and a single switch for controlling all of said circuits.

7. In a refrigerating vehicle, electrically operated means for driving the vehicle, electrically operated refrigerating means, a source of current carried upon the vehicle and adapted to be connected with and when so connected to operate either or both the driving means and the refrigerating means, means for connecting the refrigerating means to a source of current outside of the vehicle and means for disconnecting the refrigerating means from the source of current upon the vehicle when it is connected to a source of current outside the vehicle.

8. In a vehicle the combination of electric means for driving th vehicle, electric refrigerating means, one or more storage batteries, conductors by which said batteries may be connected with and operate either or both the driving means and the refrigerating means, conducting members by which the batteries and the refrigerating means may be connected to an external source of current suitable for charging the batteries and a single switch adapted to connect the batteries with the driving motor and the refrigerating means or the refrigerating means alone or to connect both the batteries and the refrigerating means to the external source of current.

9. An electrically driven vehicle having an electrically refrigerated compartment, which comprises one or more storage batteries adapted to operate either or both the driving means and the refrigerating means, conductors adapted to connect said storage batteries with either or both of said means, and additional conductors adapted, when the circuits formed by the first named conductors are open, to connect either or both the storage batteries and the refrigerating means to a source of current suitable for charging the batteries.

10. An apparatus as defined in claim 9 in which the conductor connecting the charging source of current to the batteries includes means for breaking the connection and the conductor for connecting the refrigerating means to the charging source of current includes means to prevent overloading the circuit when the circuit to the batteries is broken.

Signed at Mount Vernon, N. Y., this 25th day of June 1928.

CHARLES A. WARD.
OSCAR E. H. FROELICH.